No. 895,172. PATENTED AUG. 4, 1908.
F. ECAUBERT.
COMPENSATING CONTROLLER FOR TIMEPIECES.
APPLICATION FILED FEB. 16, 1906. RENEWED DEC. 27, 1907.
2 SHEETS—SHEET 1.
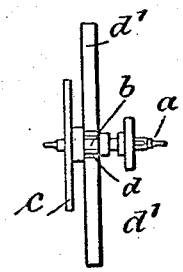
Fig. 4.
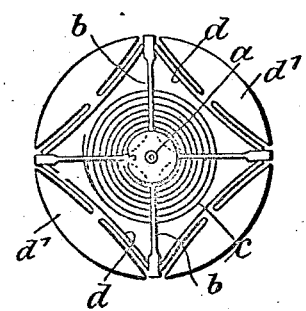
Fig. 1.
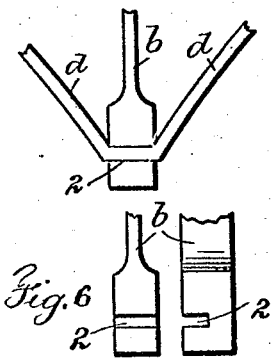
Fig. 5.
Fig. 6.
Fig. 7.
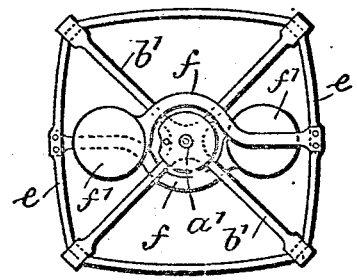
Fig. 2.
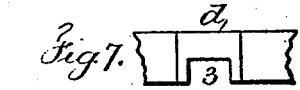
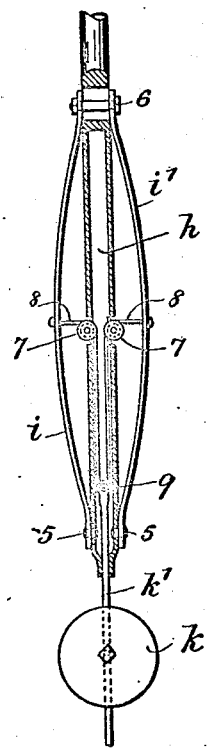
Fig. 8.
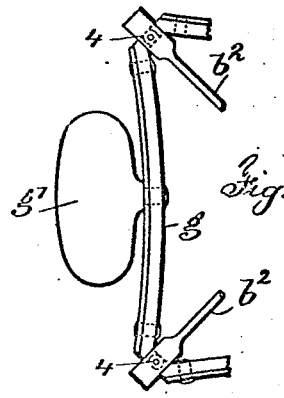
Fig. 3.
Witnesses
Chas H Smith
Inventor
Frederic Ecaubert.
Harold Serrell
his atty No. 895,172. PATENTED AUG. 4, 1908.
F. ECAUBERT.
COMPENSATING CONTROLLER FOR TIMEPIECES.
APPLICATION FILED FEB. 16, 1906. RENEWED DEC. 27, 1907.
2 SHEETS—SHEET 2.
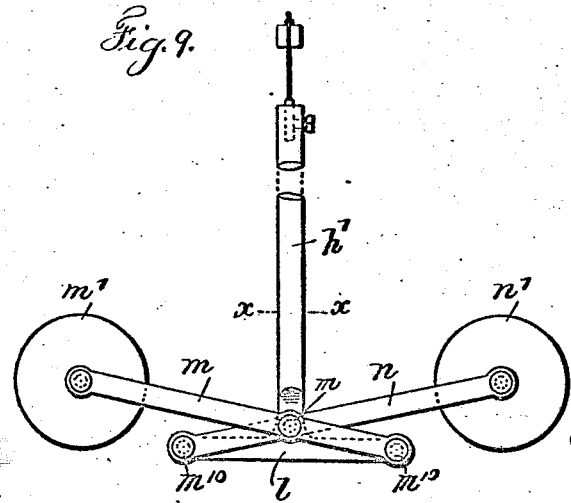
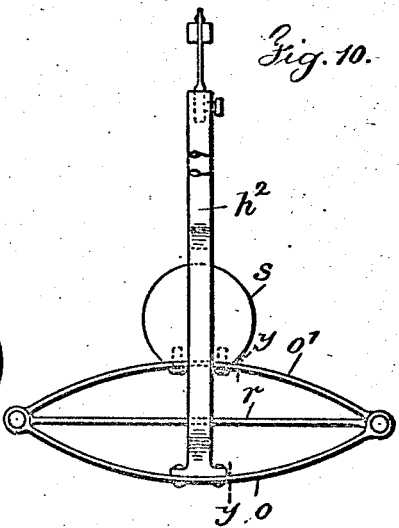
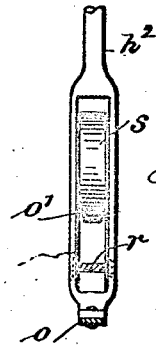
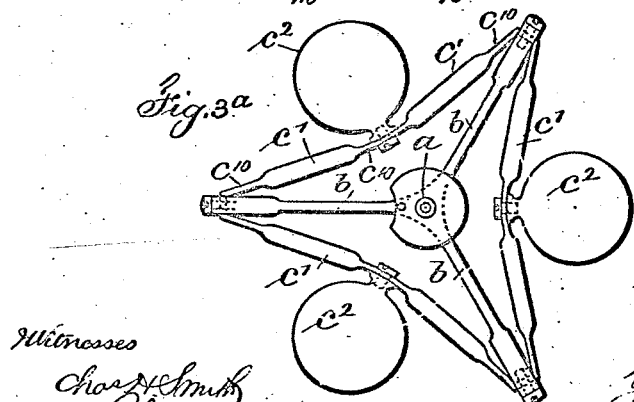
Witnesses
Chas H Smith
Inventor
Frederic Ecaubert
per Harold Serrell
his atty

UNITED STATES PATENT OFFICE.

FREDERIC ECAUBERT, OF NEW YORK, N. Y.

COMPENSATING CONTROLLER FOR TIMEPIECES.

No. 895,172.　　　Specification of Letters Patent.　　　Patented Aug. 4, 1908.

Application filed February 16, 1906, Serial No. 301,374. Renewed December 27, 1907. Serial No. 408,266.

*To all whom it may concern:*

Be it known that I, FREDERIC ECAUBERT, of the city of New York, borough of Brooklyn, county of Kings, and State of New York, have invented certain new and useful Improvements in Compensating Escapement-Regulators, of which the following is a specification.

The present invention relates to escapement regulators for time pieces and has more particularly reference to means for compensating for temperature-induced variations in the size of the regulator.

Compensating regulators or balance wheels have long been known in the art but great difficulty has always been experienced in obtaining enough compensation, and furthermore in obtaining the exact amount of compensation needed.

The object of the present invention is to simplify the structure heretofore used to the end that the more advantageous disposition of the parts composing the escapement regulator will result in effecting the proper amount of compensation needed.

Accordingly the invention consists of an escapement regulator composed of a member having a low co-efficient of expansion and provided with two resistant supports, and a yielding member having a high co-efficient of expansion interposed between the said two resistant supports in such a manner that the said resistant supports will move only within the limit of movement of their own inherent expansion and contraction and whereby the resistance of the two supports will cause the yielding member by the latter's own expansion or contraction to move in a predetermined path to compensate for temperature-induced variations in size of the regulator.

When the invention is applied to a balance wheel the member having a low co-efficient of expansion will take the form of a hub portion having a plurality of resistant spokes arranged symmetrically with reference to each other and with reference to the center of oscillation, while the yielding member of a high co-efficient of expansion will be interposed between the outer ends of each pair of neighboring spokes and will preferably consist of a bar having a normal flex toward the center of oscillation.

In the accompanying drawings the invention is embodied in several concrete forms, one of which is a preferred form. It is to be understood, however, that variations may be made from the forms shown without departing from the legitimate and intended scope of the invention.

In the said drawings:—Figures 1, 2, 3, and $3^a$ are plan views of different forms of balance wheels embodying the invention. Fig. 4 is a side elevation of the construction shown in Fig. 1. Figs. 5, 6, and 7 are detail views of certain parts shown in Figs. 1 and 4. Fig. 8 is a view partly in section of a pendulum embodying the invention. Figs. 9 and 10 show modified forms of the same invention when applied to a pendulum. Figs. 11 and 12 are sectional views respectively on the line $x$—$x$ of Fig. 9 and $y$—$y$ of Fig. 10.

Referring to Figs. 1, $3^a$, 4, 5, 6, and 7: $a$ represents the arbor of the wheel. The member having a low co-efficient of expansion consists of the spokes $b$ symmetrically arranged with reference to the center of oscillation and with reference to each other and are connected by a central hub portion as shown. Interposed between the outer ends of each pair of neighboring spokes is a yielding member having a high co-efficient of expansion. In Figs. 1 and 4 this member is denoted by $d$ and as shown has a normal flex toward the center of oscillation so that when it expands it will always move in a predetermined path. Connected to this yielding member $d$ is a weight $d^1$.

$c$ indicates the spiral hair spring.

In Figs. 5, 6, and 7 are shown in detail the particular means here used to connect the spokes and yielding members. The spokes are cut away at 2 to receive a strip of metal forming a part of the yielding member. The said yielding member being likewise cut away at 3 to receive the spoke.

In Fig. $3^a$ the yielding member is in the form of a bar $c^1$ seated between adjacent spokes and provided with the attenuated portions $c^{10}$ which act after the fashion of pivot joints. Each bar carries a weight $c^2$ between each pair of adjacent spokes.

It will be seen that by the arrangement disclosed the resistant spokes will move only within the limit of movement of their own inherent expansion and contraction and that the resistance of the said two spokes will cause the yielding member by the latter's own expansion or contraction to move in a predetermined path to compensate for temperature-induced variations in size of the regulator.

In Fig. 2 the resistant spokes are indicated by $b^1$ and the yielding member by $e$. In this instance the said yielding member has a normal flex away from the center of oscillation but is provided with the arm $f$ extending beyond the center of oscillation where it supports the weight $f^1$. Thus an outward movement of the yielding member will cause the weight to approach the center of oscillation, and the same result is obtained as with the previously described forms.

In Fig. 3 the resistant spokes are denoted by $b^2$ and the yielding member $g$ here consists of two strips of material as shown, the inner strip being preferably of brass and relatively thick while the outer strip is preferably of steel and comparatively thin. This yielding member is movably connected to the resistant spokes by means of the pivots 4.

$g^1$ indicates the weight.

In Fig. 8 the member having a low co-efficient of expansion takes the form of the central tube $h$ which preferably forms a part of the pendulum rod.

$i$ and $i^1$ indicate two expansible members having a high co-efficient of expansion interposed between two points of support of the member $h$ by means of rivets 5 and the bolt 6. The lower end of the tube member $h$ is contracted to form a guide for the rod $k^1$ carrying the weight $k$. At the end of this rod is a pulley 9. A cord 8 passes beneath the pulley 9 and upwardly over the pulleys 7 mounted on the tubular member $h$, the ends of said cord passing from pulleys 7 to the middle portions of the members $i$ and $i^1$ with which they are connected. An increase in temperature would expand the members $i$ and $i^1$ more than the member $h$ and hence would cause the said members $i$ and $i^1$ to lift the weight $k$ thereby compensating for the increase in length of the pendulum rod.

In Figs. 9 and 11 the member having a low co-efficient of expansion takes the form of a bar $l$ carried by the pendulum rod $h^1$.

$m$ and $n$ indicate the expansible member which in this instance is made yielding by means of pivots $m^{10}$ and $m^{11}$. At their outer ends the members $m$ and $n$ carry the weights $m^1$ and $n^1$. Here as in the other instances the yielding member is interposed between two resistant supports.

In Figs. 10 and 12 the member having a low co-efficient of expansion is indicated by the resistant bar $r$ while the yielding member is indicated by the two elliptical expansible bars $o$ and $o^1$ interposed between two points of resistant supports of the resistant bar $r$. The bar $o$ is provided with a weight $s$ and the whole device is carried by the pendulum rod $h^2$.

What is claimed is:—

1. In an escapement regulator, a member having a low co-efficient of expansion and provided with two resistant supports, a yielding member having a high co-efficient of expansion interposed between the said two resistant supports in such a manner that the said resistant supports will move only within the limit of movement of their own inherent expansion and contraction and whereby the resistance of the two supports will cause the yielding member by the latter's own expansion or contraction to move in a predetermined path to compensate for temperature-induced variations in size of the regulator.

2. In an escapement regulator, a member having a low co-efficient of expansion and provided with two resistant supports, a yielding member having a high co-efficient of expansion interposed between the said two resistant supports in such a manner that the said resistant supports will move only within the limit of movement of their own inherent expansion and contraction and whereby the resistance of the two supports will cause the yielding member by the latter's own expansion or contraction to move in a predetermined path to compensate for temperature-induced variations in size of the regulator, and a weight carried by the yielding member.

3. In a balance wheel, a member having a low co-efficient of expansion provided with a plurality of resistant spokes, a yielding member having a high co-efficient of expansion interposed between each pair of neighboring spokes in such a manner that the said spokes will move only within the limit of movement of their own inherent expansion or contraction and whereby the resistance of the said spokes will cause the yielding member by the latter's own expansion or contraction to move in a predetermined path to compensate for temperature-induced variations in size of the balance wheel.

4. In a balance wheel, a member having a low co-efficient of expansion provided with a plurality of resistant spokes, a yielding member having a high co-efficient of expansion interposed between each pair of neighboring spokes in such a manner that the said spokes will move only within the limit of movement of their own inherent expansion or contraction and whereby the resistance of the said spokes will cause the yielding member by the latter's own expansion or contraction to move in a predetermined path to compensate for temperature-induced variations in size of the balance wheel, and a weight carried by each of the said yielding members.

5. In a balance wheel, a member having a low co-efficient of expansion and provided with a plurality of resistant spokes, a yielding member having a high co-efficient of expansion, and comprising a bar, interposed between each pair of neighboring spokes in such a manner that the said spokes will move only within the limit of movement of their own inherent expansion or contraction and whereby the resistance of the said spokes will cause the yielding member by the latter's own expansion or contraction to move in a predetermined path to compensate for temperature induced variations in size of the balance wheel.

6. In a balance wheel, a member having a low co-efficient of expansion and provided with a plurality of resistant spokes, a yielding member having a high co-efficient of expansion, and comprising a bar, interposed between each pair of neighboring spokes in such a manner that the said spokes will move only within the limit of movement of their own inherent expansion and contraction and whereby the resistance of the said spokes will cause the yielding member by the latter's own expansion or contraction to move in a predetermined path to compensate for temperature-induced variations in size of the balance wheel, and a weight connected to each bar between each pair of adjacent spokes.

7. In a balance wheel, a member having a low co-efficient of expansion and provided with a plurality of resistant spokes, a yielding member having a high co-efficient of expansion, consisting of a bar having a normal flex toward the center of oscillation interposed between each pair of neighboring spokes in such a manner that the said spokes will move only within the limit of movement of their own inherent expansion or contraction and whereby the resistance of the said spokes will cause the yielding member by the latter's own expansion or contraction to move in a predetermined path to compensate for temperature-induced variations in size of the balance wheel.

8. In a balance wheel, a member having a low co-efficient of expansion and provided with a plurality of resistant spokes, a yielding member having a high co-efficient of expansion, consisting of a bar having a normal flex toward the center of oscillation, interposed between each pair of neighboring spokes in such a manner that the said spokes will move only within the limit of movement of their own inherent expansion or contraction and whereby the resistance of the said spokes will cause the yielding member by the latter's own expansion or contraction to move in a predetermined path to compensate for temperature induced variations in size of the balance wheel, and a weight connected to each bar between each pair of neighboring spokes.

9. In a balance wheel, a member having a low co-efficient of expansion provided with a plurality of resistant spokes, and a yielding member, having a high co-efficient of expansion and of a length greater than the length of the individual spokes, interposed between each pair of neighboring spokes.

Signed by me this 31st day of January 1906.

FREDERIC ECAUBERT.

Witnesses:
GEO. T. PINCKNEY,
E. ZACHARIASEN.